(12) United States Patent
Lavelle et al.

(10) Patent No.: US 6,795,081 B2
(45) Date of Patent: Sep. 21, 2004

(54) SAMPLE CACHE FOR SUPERSAMPLE FILTERING

(75) Inventors: Michael G. Lavelle, Saratoga, CA (US); Philip C. Leung, Fremont, CA (US); Yan Y. Tang, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 297 days.

(21) Appl. No.: 09/861,479

(22) Filed: May 18, 2001

(65) Prior Publication Data

US 2002/0171656 A1 Nov. 21, 2002

(51) Int. Cl.$^7$ ................................................ G09G 5/36
(52) U.S. Cl. ...................................... 345/557; 345/537
(58) Field of Search .............................. 345/501–506, 345/519–520, 522, 530, 574, 418, 419, 611, 613

(56) References Cited

U.S. PATENT DOCUMENTS

| | | | | |
|---|---|---|---|---|
| 5,943,060 A | * | 8/1999 | Cosman et al. | 345/613 |
| 6,326,964 B1 | * | 12/2001 | Snyder et al. | 345/419 |
| 6,344,852 B1 | * | 2/2002 | Zhu et al. | 345/418 |
| 6,614,449 B1 | * | 9/2003 | Morein | 345/555 |
| 6,717,578 B1 | | 4/2004 | Deering | 345/428 |

* cited by examiner

Primary Examiner—Kee M. Tung
(74) Attorney, Agent, or Firm—Meyertons Hood Kivlin Kowert & Goetzel, P.C.; Jeffrey C. Hood

(57) ABSTRACT

A system and method capable of super-sampling and performing super-sample convolution are disclosed. In one embodiment, the system may comprise a graphics processor, a frame buffer, a sample cache, and a sample-to-pixel calculation unit. The graphics processor may be configured to generate a plurality of samples. The frame buffer, which is coupled to the graphics processor, may be configured to store the samples in a sample buffer. The samples may be positioned according to a regular grid, a perturbed regular grid, or a stochastic grid. The sample-to-pixel calculation unit is programmable to select a variable number of stored samples from the frame buffer, copy the selected samples to a sample cache, and filter a set of the selected samples into an output pixel. The sample-to-pixel calculation unit retains those samples in the sample cache that will be reused in a subsequent pixel calculation and replaces those samples no longer required with new samples for another filter calculation.

26 Claims, 12 Drawing Sheets

SAMPLE CACHE FOR SUPERSAMPLE FILTERING

BACKGROUND OF THE INVENTION

1. Field of the Invention

This invention relates generally to the field of computer graphics and, more particularly, to high performance computer graphics systems.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card to draw a box at specified coordinates. The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their computers.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

While the number of pixels is an important factor in determining graphics system performance, another factor of equal import is the quality of the image. For example, an image with a high pixel density may still appear unrealistic if edges within the image are too sharp or jagged (also referred to as "aliased"). One well-known technique to overcome these problems is anti-aliasing. Anti-aliasing involves smoothing the edges of objects by shading pixels along the borders of graphical elements. More specifically, anti-aliasing entails removing higher frequency components from an image before they cause disturbing visual artifacts. For example, anti-aliasing may soften or smooth high contrast edges in an image by forcing certain pixels to intermediate values (e.g., around the silhouette of a bright object superimposed against a dark background).

Another visual effect used to increase the realism of computer images is alpha blending. Alpha blending is a technique that controls the transparency of an object, allowing realistic rendering of translucent surfaces such as water or glass. Another effect used to improve realism is fogging. Fogging obscures an object as it moves away from the viewer. Simple fogging is a special case of alpha blending in which the degree of alpha changes with distance so that the object appears to vanish into a haze as the object moves away from the viewer. This simple fogging may also be referred to as "depth cueing" or atmospheric attenuation, i.e., lowering the contrast of an object so that it appears less prominent as it recedes. More complex types of fogging go beyond a simple linear function to provide more complex relationships between the level of translucence and an object's distance from the viewer. Current state of the art software systems go even further by utilizing atmospheric models to provide low-lying fog with improved realism.

While the techniques listed above may dramatically improve the appearance of computer graphics images, they also have certain limitations. In particular, they may introduce their own aberrations and are typically limited by the density of pixels displayed on the display device.

As a result, a graphics system is desired which is capable of utilizing increased performance levels to increase not only the number of pixels rendered but also the quality of the image rendered. In addition, a graphics system is desired which is capable of utilizing increases in processing power to improve the results of graphics effects such as anti-aliasing.

Prior art graphics systems have generally fallen short of these goals. Prior art graphics systems use a conventional frame buffer for refreshing pixel/video data on the display. The frame buffer stores rows and columns of pixels that exactly correspond to respective row and column locations on the display. Prior art graphics system render 2D and/or 3D images or objects into the frame buffer in pixel form, and then read the pixels from the frame buffer during a screen refresh to refresh the display. Thus, the frame buffer stores the output pixels that are provided to the display. To reduce visual artifacts that may be created by refreshing the screen at the same time the frame buffer is being updated, most graphics systems' frame buffers are double-buffered.

To obtain more realistic images, some prior art graphics systems have gone further by generating more than one sample per pixel. As used herein, the term "sample" refers to calculated color information that indicates the color, depth (z), transparency, and potentially other information, of a particular point on an object or image. For example a sample may comprise the following component values: a red value, a green value, a blue value, a z-depth value, and an alpha value (e.g., representing the transparency of the sample). A sample may also comprise other information, e.g., a blur value, an intensity value, or brighter-than-bright information. By calculating more samples than pixels (i.e., super-sampling), a more detailed image is calculated than can be displayed on the display device. For example, a graphics system may calculate four samples for each pixel to be output to the display device. After the samples are calculated, they are then combined or filtered to form the pixels that are stored in the frame buffer and then conveyed to the display device. Using pixels formed in this manner may create a more realistic final image because the filtering process may smooth overly abrupt changes in the image. Details of one type of super-sampling graphics system can be found in co-pending U.S. patent application Ser. No. 09/251,840, filed Feb. 17, 1999, by Michael F. Deering entitled "A Graphics System With A Variable-Resolution Sample Buffer," which is incorporated by reference in its entirety.

Super-sampling has been used for the last decade as a method to blend the information contained in many samples clustered about a pixel location to achieve a more visually acceptable rendering of the original objects. In early versions of super-sampling, samples were processed off-line for a single frame and then reassembled in sequence later for real time viewing. Later versions of super-sampling process a pixel's worth of samples in-line to calculate new data, read the old data from the frame buffer for the pixel, compare old and new data to determine if a blend or replacement is required, and then write the updated data back to the frame buffer. This multi-step process involves many read and write operations to the frame buffer. The time required for the process is therefore related to the clock speed of the frame buffer. Many sample points may be included in more than one pixel's sample region, thus further contributing to the inefficiency of this process. To meet the demands for more realistic graphic displays (more filtering of more samples) and increased resolution (more pixels), a faster and more efficient method of super-sampling is needed.

SUMMARY

The problems set forth above may at least in part be solved by a high-speed graphics system that utilizes, in one embodiment, a graphics processor, a sample buffer, a sample cache (for storing a selected sub-set of the sample buffer), a sample-to-pixel calculation (filtering) unit, and a frame buffer (for storing the calculated pixel values).

The graphics processor generates a plurality of samples and stores them into the sample buffer. In one embodiment, the graphics processor typically generates and stores a total number of samples far greater than the number of pixel locations on the display.

The sample-to-pixel calculation unit is configured in one embodiment to read the sub-set of samples from the sample buffer, store them in the sample cache, and filter or convolve the samples into a respective output pixel. The output pixel is then stored in the frame buffer and used to refresh a display. Note as used herein the terms "filter" and "convolve" are used interchangeably and refer to mathematically manipulating one or more samples to generate a pixel (e.g., by averaging, by applying a convolution function, by summing, by applying a filtering function, by weighting the samples and then manipulating them, by applying a randomized function, or by combinations of these and other contemplated examples). The sample-to-pixel calculation unit selects one or more samples and filters them to generate an output pixel. Note the number of samples selected and or filtered by the sample-to-pixel calculation unit may be one or, in another embodiment, greater than one.

In some embodiments, the number of samples used to form each pixel may vary. For example, the underlying average sample density in the sample buffer may vary, the extent of the filter may vary, or the number of samples for a particular pixel may vary due to stochastic variations in the sample density. In some embodiments the number may vary on a per-pixel basis, on a per-scan line basis, on a per-region basis, on a per-frame basis, or the number may remain constant.

In some embodiments, the graphics processor is further configurable to vary the positioning of the samples generated. For example, the samples may be positioned according to a regular grid, a perturbed regular gird, or in regions of higher or lower sample density. In one embodiment, the sample positions may be stored as offsets rather than absolute addresses or coordinates. In one embodiment, the graphics processor is operable to programmatically configure or vary the sample positions on a frame-by-frame basis.

A software program embodied on a computer medium and a method for operating a graphics subsystem are also contemplated. In one embodiment, the method comprises first calculating a plurality of sample locations and corresponding sample values (color, transparency, and others). The samples may then be stored into a sample buffer. The sample locations may be specified according to any number of positioning or spacing schemes, e.g., a regular grid, a perturbed regular grid, or a stochastic grid. Subsets of the stored samples may then be selected and filtered to form output pixels, which are stored in a traditional frame buffer. The samples may be selected according to their distance from the center of the convolution kernel (which may correspond to the estimated center of the output pixel). The selected samples may be multiplied by a weighting factor and summed. The output pixel is also normalized (e.g., through the use of pre-normalized weighting factors that are looked up, or by dividing the summed sample values by a calculated or pre-calculated normalization factor). In some embodiments, the selection process, weighting process, and normalization process are each programmable and changeable for each particular frame or window.

An increase in speed in some embodiments of the computer graphics system may be achieved in part by use of the sample cache for temporary storage of the selected sub-set of the sample buffer. In some embodiments, a faster clock rate may also be used by the sample cache and by the sample-to-pixel calculation unit. In some embodiments, the time required to access data in the sample cache may be approximately ⅙ the time required to access data from the sample buffer. The use of a sample cache may also reduce the number of reads required from the sample buffer in some embodiments. The sample cache may also allow samples to be reused in the calculations for more than one pixel without additional sample buffer reads. The sample cache memory may also be configured to allow the replacement of samples no longer needed with new samples from the sample buffer while pixel values are being calculated.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
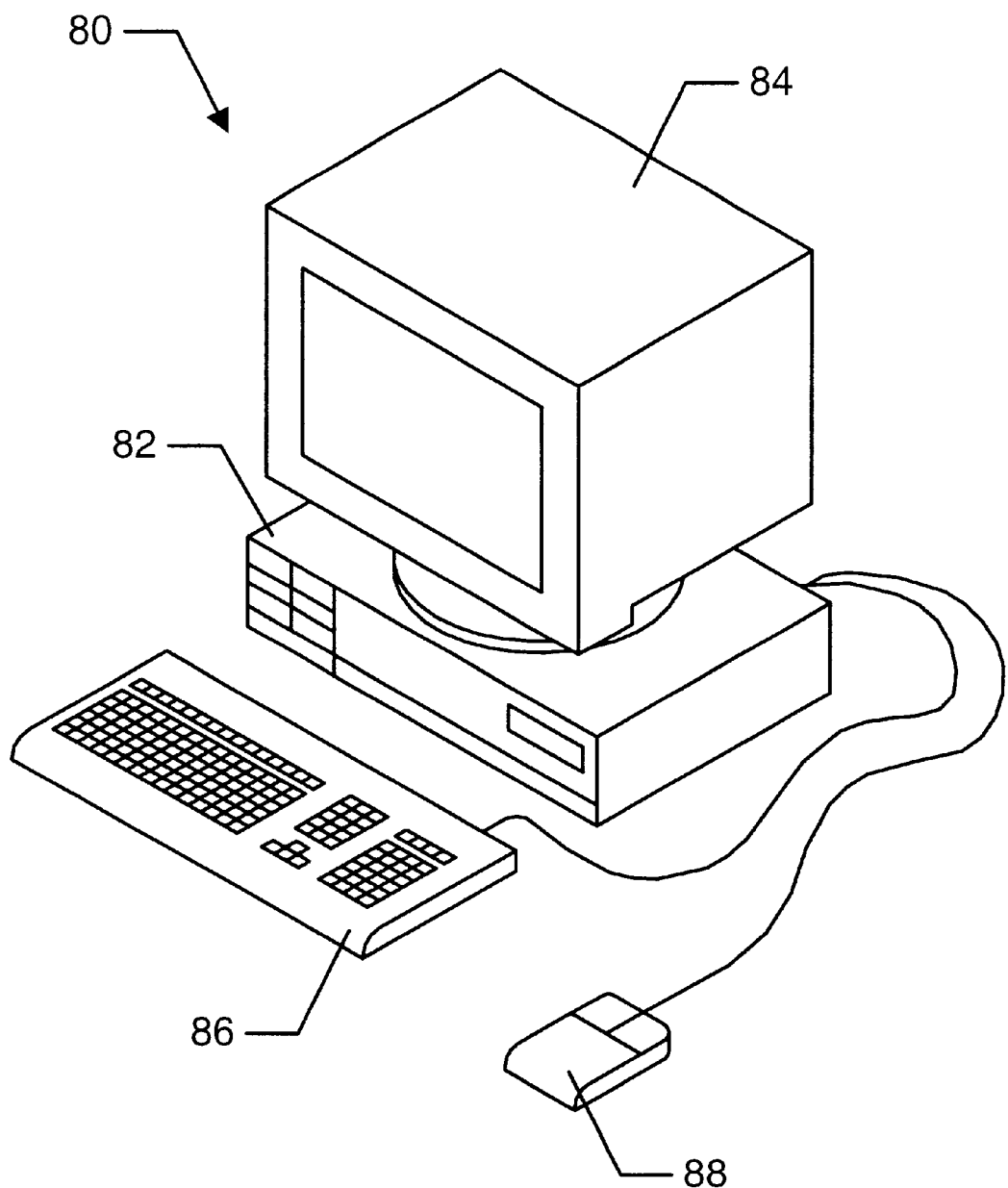
FIG. 1 illustrates one embodiment of a computer system that includes one embodiment of a graphics system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF SEVERAL EMBODIMENTS

Computer System—FIG. 1

Referring now to FIG. 1, one embodiment of a computer system 80 that includes a graphics system is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
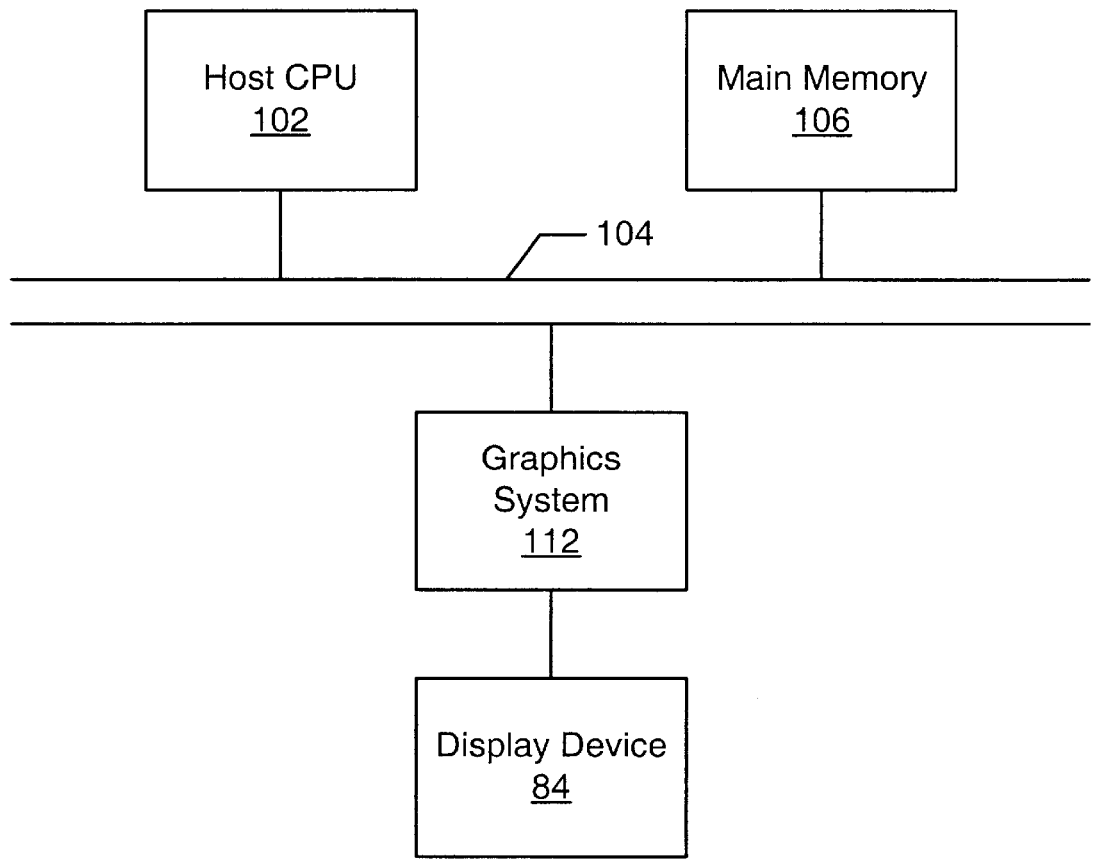
FIG. 2 is a simplified block diagram of the computer system of FIG. 1.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
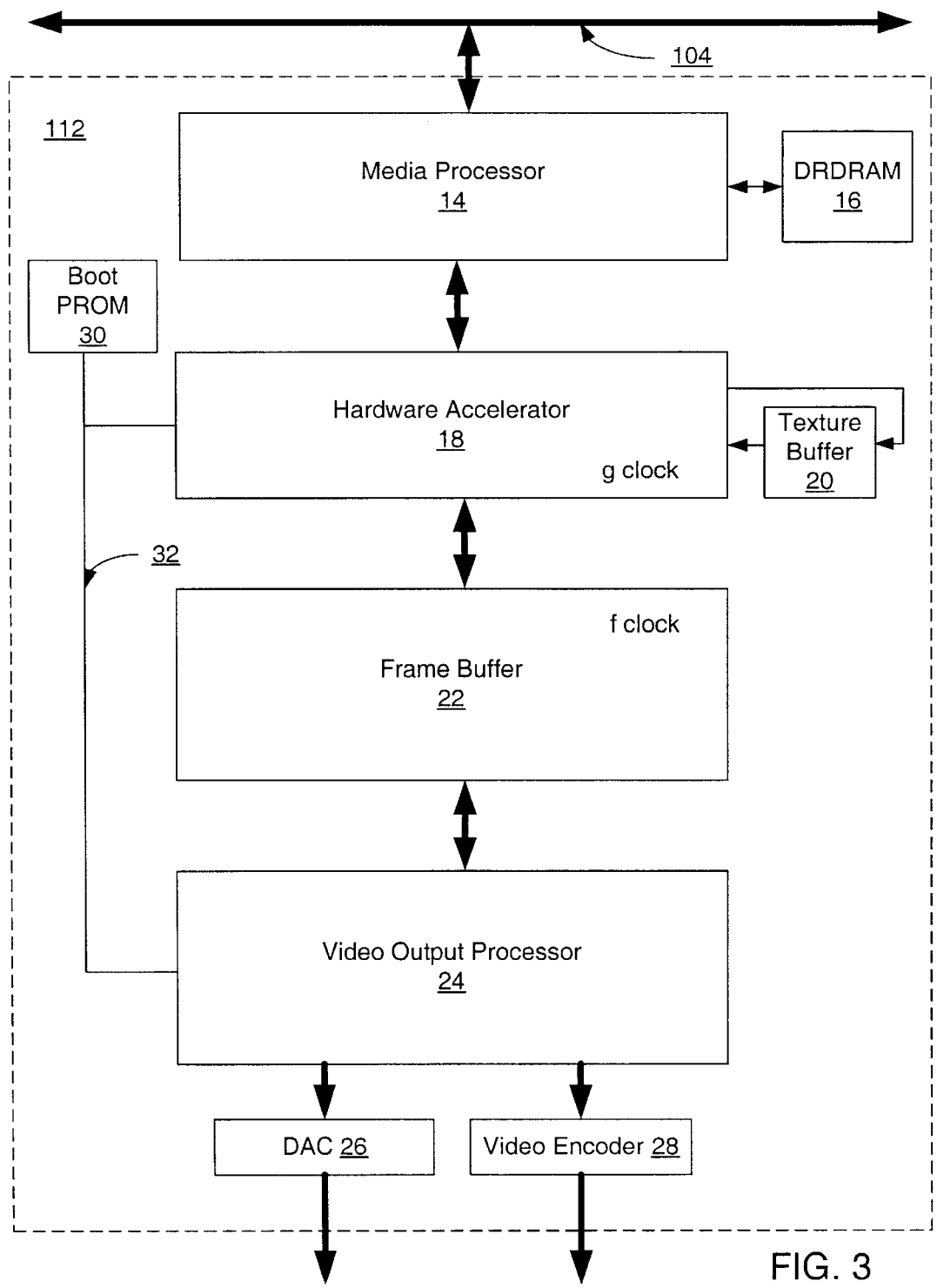
FIG. 3 is a block diagram illustrating more details of one embodiment of the graphics system of FIG. 2.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Each functional block of graphics system 112 is described in more detail below.

Figure 4:
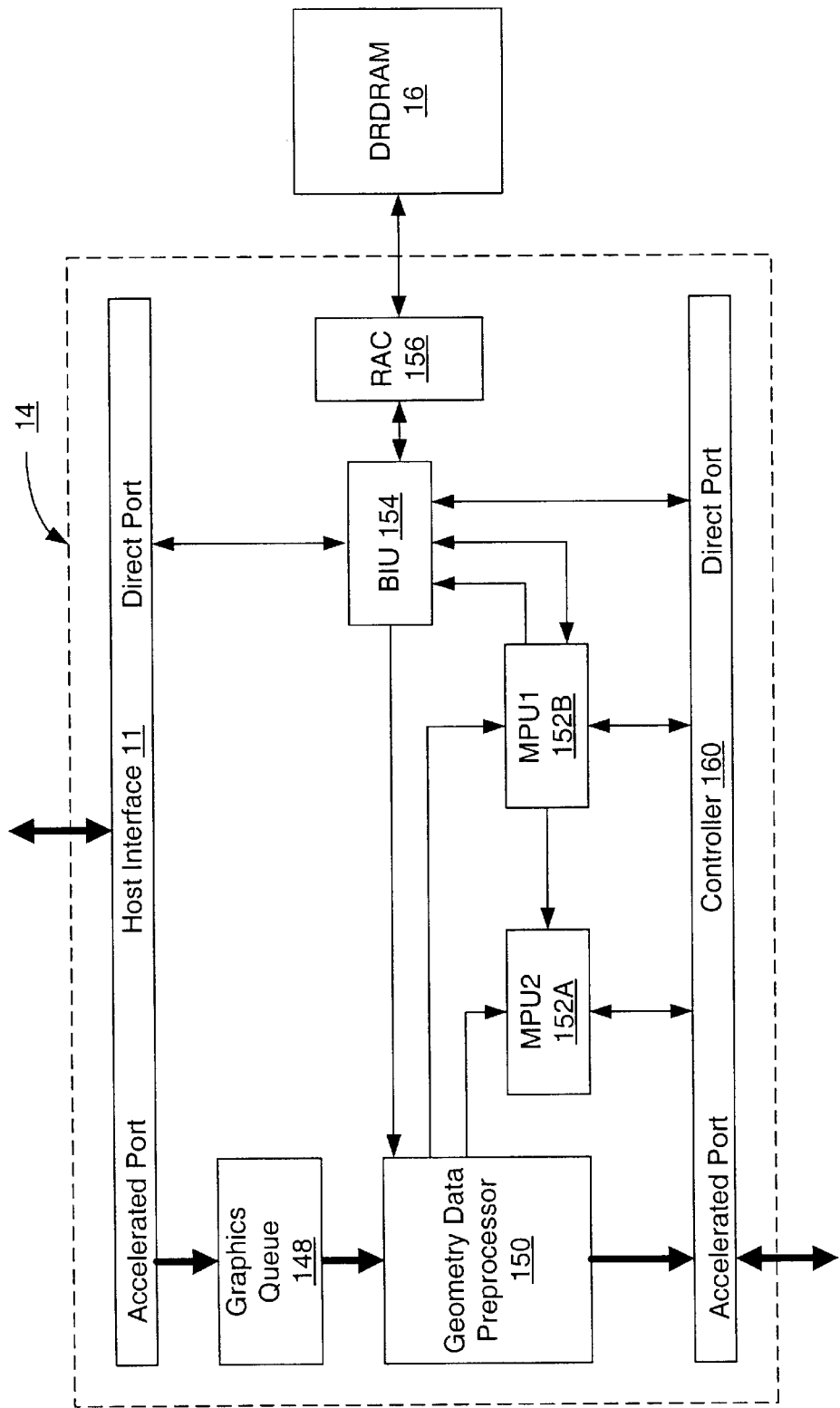
FIG. 4 is a block diagram of one embodiment of the media processor of FIG. 3.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
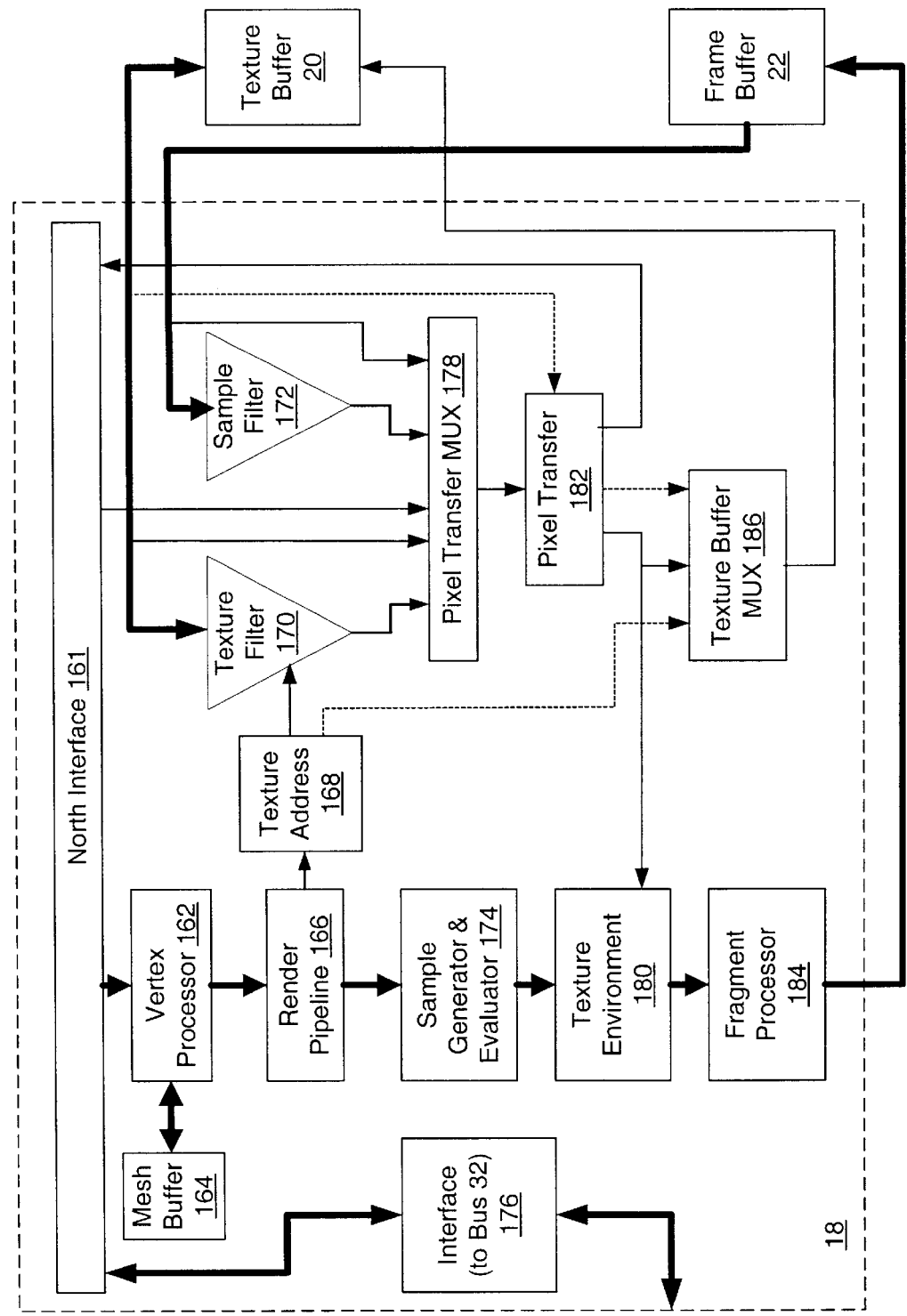
FIG. 5 is a block diagram of one embodiment of the hardware accelerator of FIG. 3.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data. Each of these features is described separately below.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate"

system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points that have color information, but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to the texture buffer 20. For example, hardware accelerator 18 may interface to texture buffer 20 using an eight-way interleaved texel bus 186 that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, S, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Graphics system 112 may also include a frame buffer 22. In one embodiment, frame buffer 22 may include multiple 3DRAM64s. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and super-sample buffer.

Figure 6:
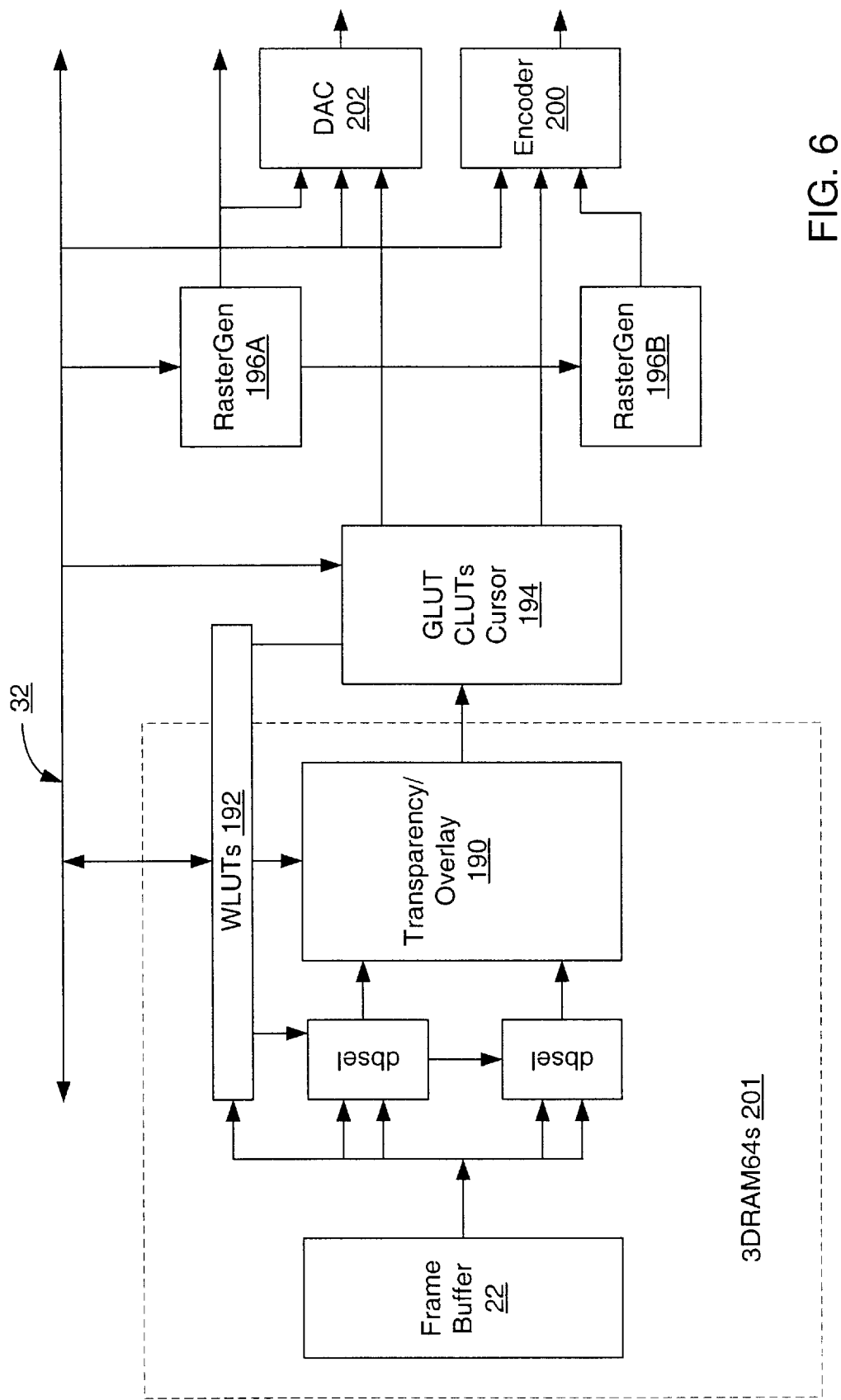
FIG. 6 is a block diagram of one embodiment of a video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the video output processor 24 may output pixel data to other combinations of displays. For example, by outputting pixel data to two DACs 202 (instead of one DAC 202 and one encoder 200), video output processor 24 may drive two CRTs. Alternately, by using two encoders 200, video output processor 24 may supply appropriate video input to two television monitors. Generally, many different combinations of display devices may be supported by supplying the proper output device and/or converter for that display device.

Figure 7:
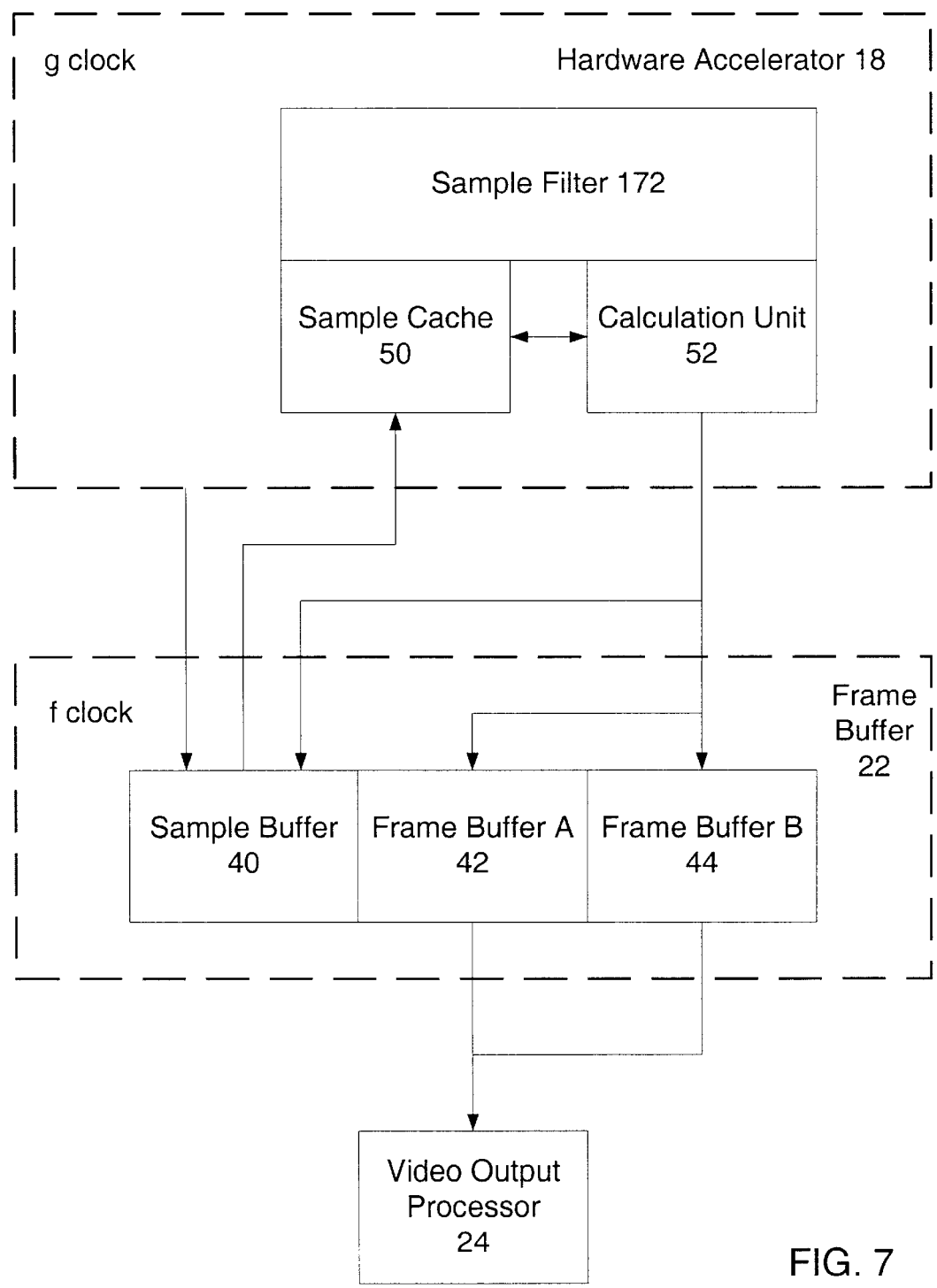
FIG. 7 is a block diagram of one embodiment of the hardware accelerator and the frame buffer of FIG. 3 illustrating more details of sample processing hardware.
Figure 8:
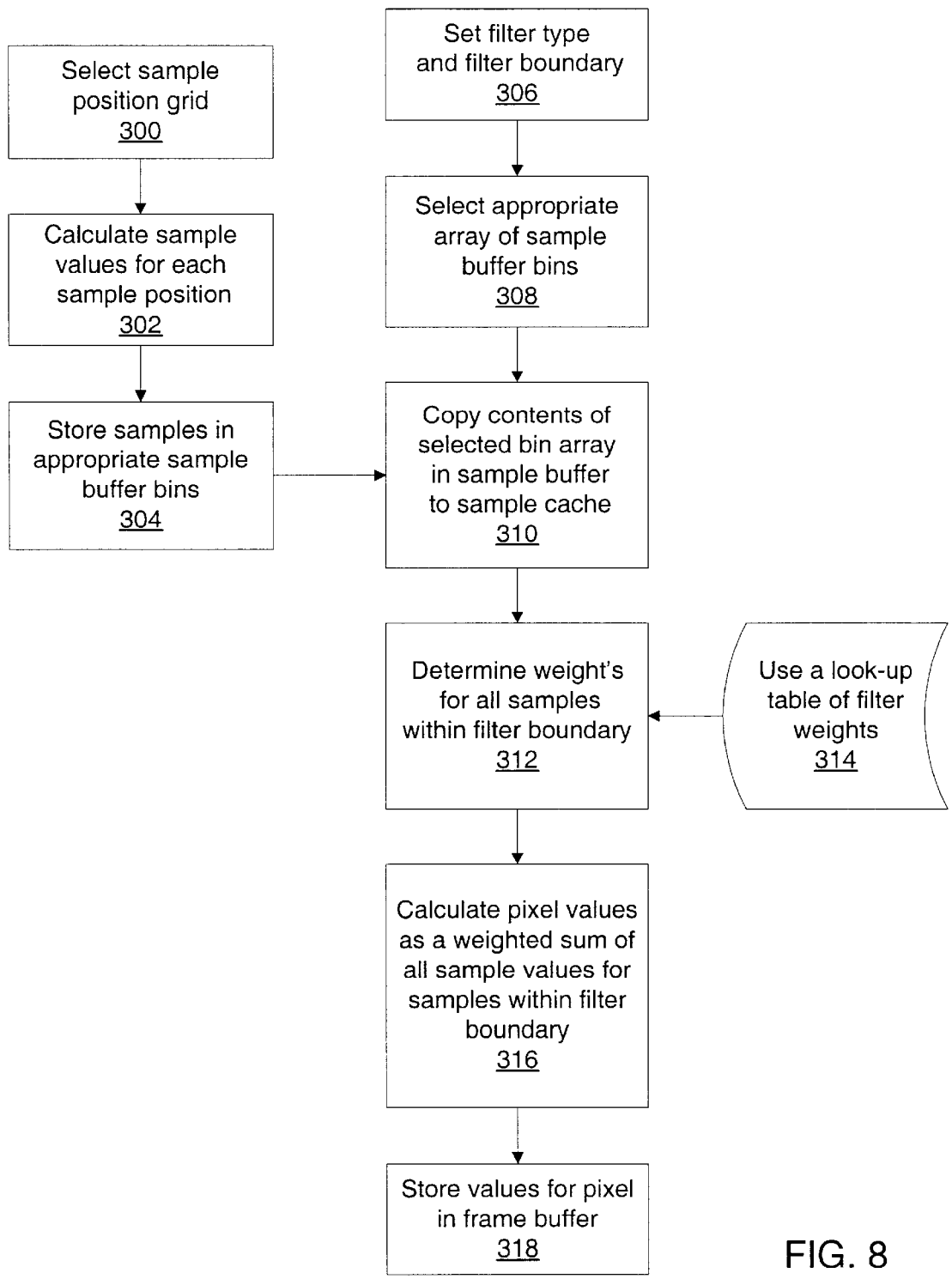
FIG. 8 is a flowchart of one embodiment of a method for filtering sample values to obtain pixel values.

Super-Sampling With Sample Cache—FIGS. 7 and 8

One embodiment of super-sampling hardware is shown in FIG. 7. The frame buffer 22 is segmented into 3 regions, a sample buffer 40, a frame buffer A 42, and a frame buffer B 44. The hardware accelerator 18 has subsections comprising a sample filter 172, a sample cache 50, and a sample-to-pixel calculation unit 52.

In one embodiment, 8 copies of 96 deep, 30 bit wide, two read and two write addressable memories were used as the sample cache 50 to store the 30 bit samples read out from the super-sample buffer 40. Other semiconductor memory types comprising SRAM, SDRAM, RDRAM, SGRAM, VRAM, 3D-RAM, or 3D-RAM 64 are possible and contemplated for the sample cache 50. The sample cache 50 acts as temporary storage for the sample data while the sample-to-pixel calculation unit 52 filters the sample data together. The sample cache 50 also resides at the transition from f clock (clock rate for the frame buffer 22) and g clock (clock rate for the hardware accelerator 18), and therefore acts as the interface between the 2 clock domains. Since the sample cache 50 and the sample-to-pixel calculation unit 52 both operate at the higher clock rate g clock, in some embodiments the time required to filter many samples into one pixel may be reduced compared to prior art.

One embodiment of a method that uses a super-sample approach for rendering objects with a graphics system is illustrated by the flowchart in FIG. 8. The hardware accelerator 18 selects a sample position grid (step 300), calculates sample values for each sample position (step 302), stores the sample values in the appropriate bins in the sample buffer 40 (step 304), and sets the filter type and filter boundary (step 306). Sample filter 172 selects an appropriate array of bins in the sample buffer 40 to accommodate the filter type and extent (step 308) and copies the contents of the bin array to the sample cache 50 (step 310). The sample-to-pixel calculation unit 52 determines relative weights for the bins in the sample cache 50 that are within the filter extent (step 312), determines weight values by using look-up tables when appropriate (step 314), and calculates pixel values as a weighted sum of the sample values of the samples selected (step 316). The sample filter 172 stores the pixel values in the appropriate memory address in the frame buffer A 42 or frame buffer B 44, depending on which buffer is not being used by the video output processor 24 (step 318).

Sample Filtering—FIGS. 9*a–e*

In one embodiment there is a plurality of samples for each pixel of display space, therefore a filtration process (also referred to as a convolution or calculation process) is required to determine the desired color values for each pixel. In one embodiment this process includes the steps of selecting a filter type, defining a region of sample space for each filter type, calculating a relative weight for each sample included in the selected region, and summing the weighted color values for all the included samples.

Figure 9A:
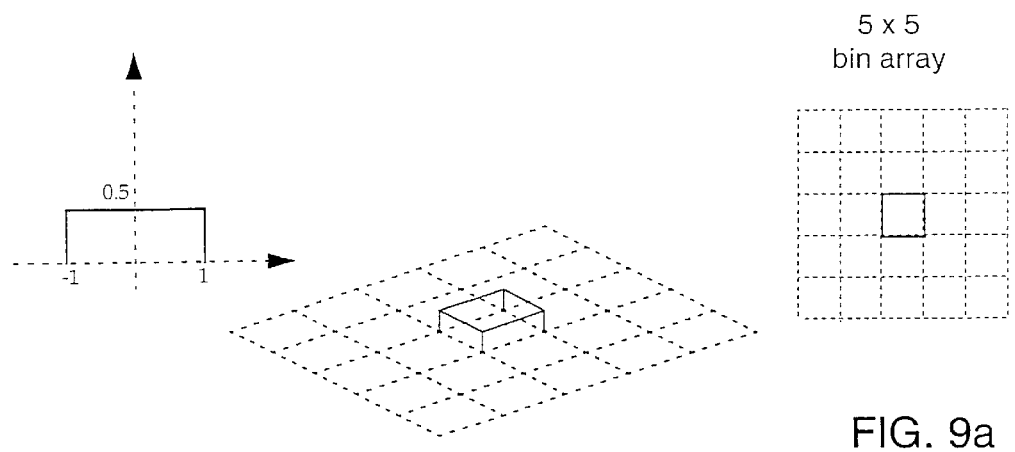
FIGS. 9a–e are representations of several embodiments of filters used to calculate pixel values from super-samples.
Figure 9B:
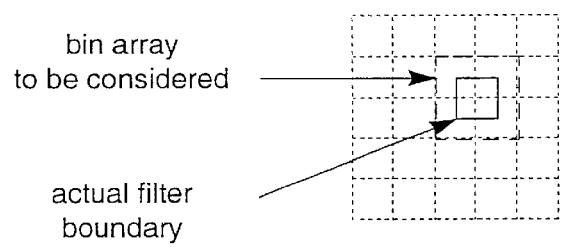
Figure 9C:
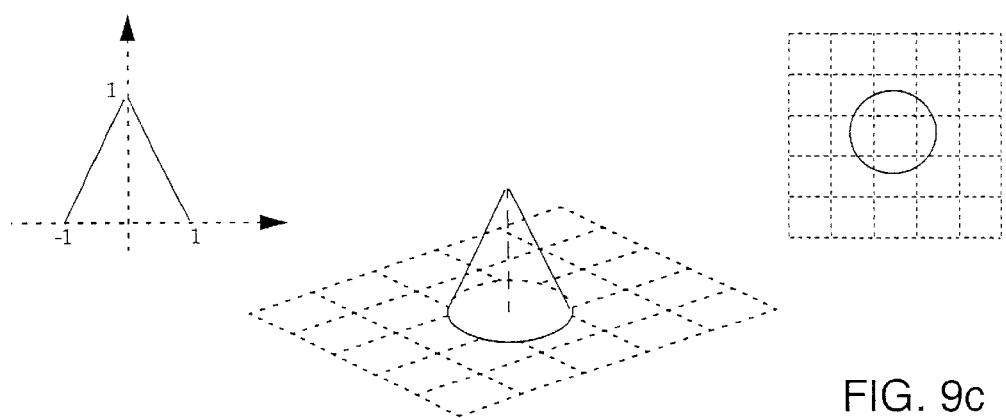
Figure 9D:
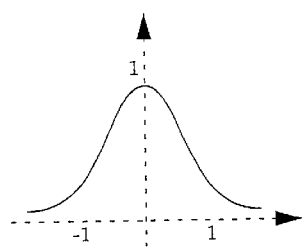
Figure 9D:
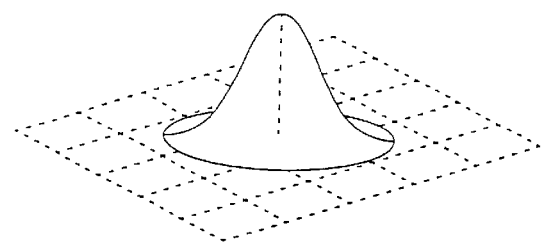
Figure 9D:
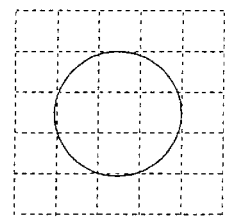
Figure 9E:
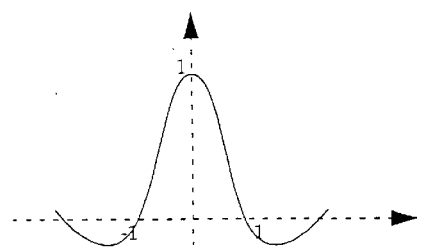
Figure 9E:
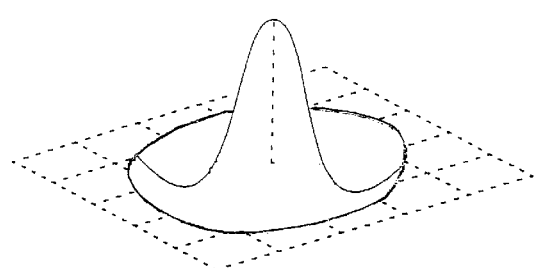
Figure 9E:
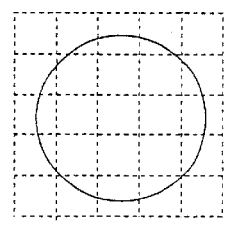

The filter center corresponds to the center of the pixel to be evaluated. All samples that are within the filter's extent may potentially contribute to the pixel. A square grid subdivides sample space, where each grid square defines a bin. In one embodiment, a bin is 1×1 pixels in size and may hold up to 16 samples, but other configurations are also possible and contemplated. Each sample is weighted according to the filter function. Filter weights may be interpolated from a lookup table. In one embodiment, a filter may include samples from 1 to 25 bins (a 5×5 array with up to 400 samples) in its calculation to determine a single pixel's color FIGS. 9*a–e* provide details of four examples of filter types that may be supported in one embodiment. FIG. 9*a* details a box filter with an area of one bin. Each sample inside the filter is weighted equally with a weight of 1/n, where n is the number of samples per bin. The pixel center may be offset from a bin center. In this case the filter may need to consider samples from a 2×1 or a 2×2 bin array (as depicted in FIG. 9*b*). FIG. 9*c* details a cone filter, where the weight of each sample increases linearly towards the center of the filter region. The filter considers samples from within a 3×3 bin area in this example. The Gaussian filter, shown in FIG. 9*d*, provides a smooth bell-shaped curve for sample weights. In the example shown in the figure, the filter considers samples from within a 4×4 bin area. The sinc filter shown in FIG. 9*e* provides higher quality filtering at a higher cost, since it involves a larger number of samples and has a more complex sample weight variance. This filter considers samples from a 5×5 bin area. Other filter types are possible and contemplated.

The filter calculates the distance (d) between the pixel center and the sample point. If d is greater than the filter radius, then the weight is set equal to zero. If d is less than the filter radius, the sample weight is set equal to a value obtained from tabulated values for the specific filter function. In some embodiments, the filter may use approximations for the distance to improve throughput. In some embodiments, d squared may be used in lieu of d to improve calculation times.

Figure 10A:
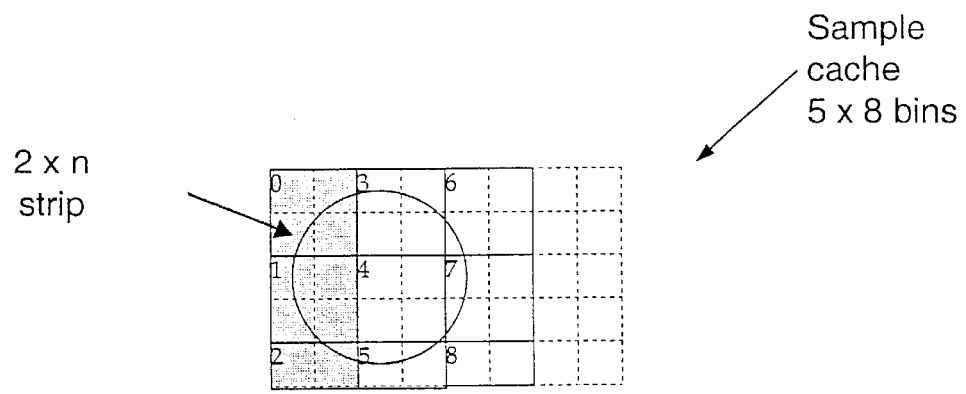
FIG. 10a illustrates one embodiment of a method for reading samples to fill a sample cache for a filtering calculation.
Figure 10B:
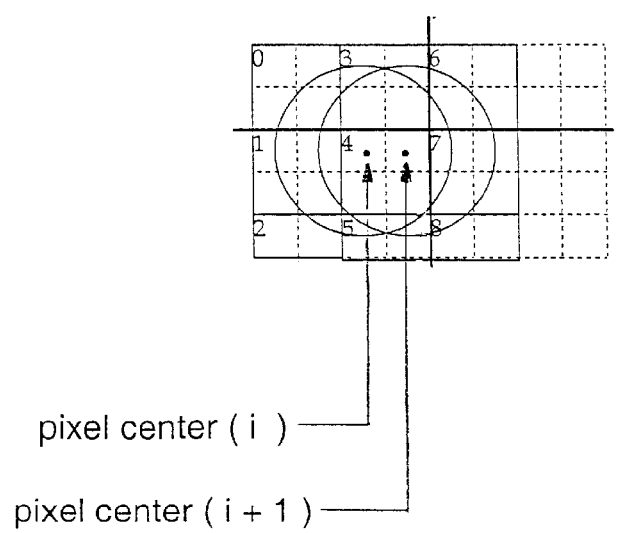
FIG. 10b illustrates one example of the reuse of samples for more than one pixel value.
Figure 11:
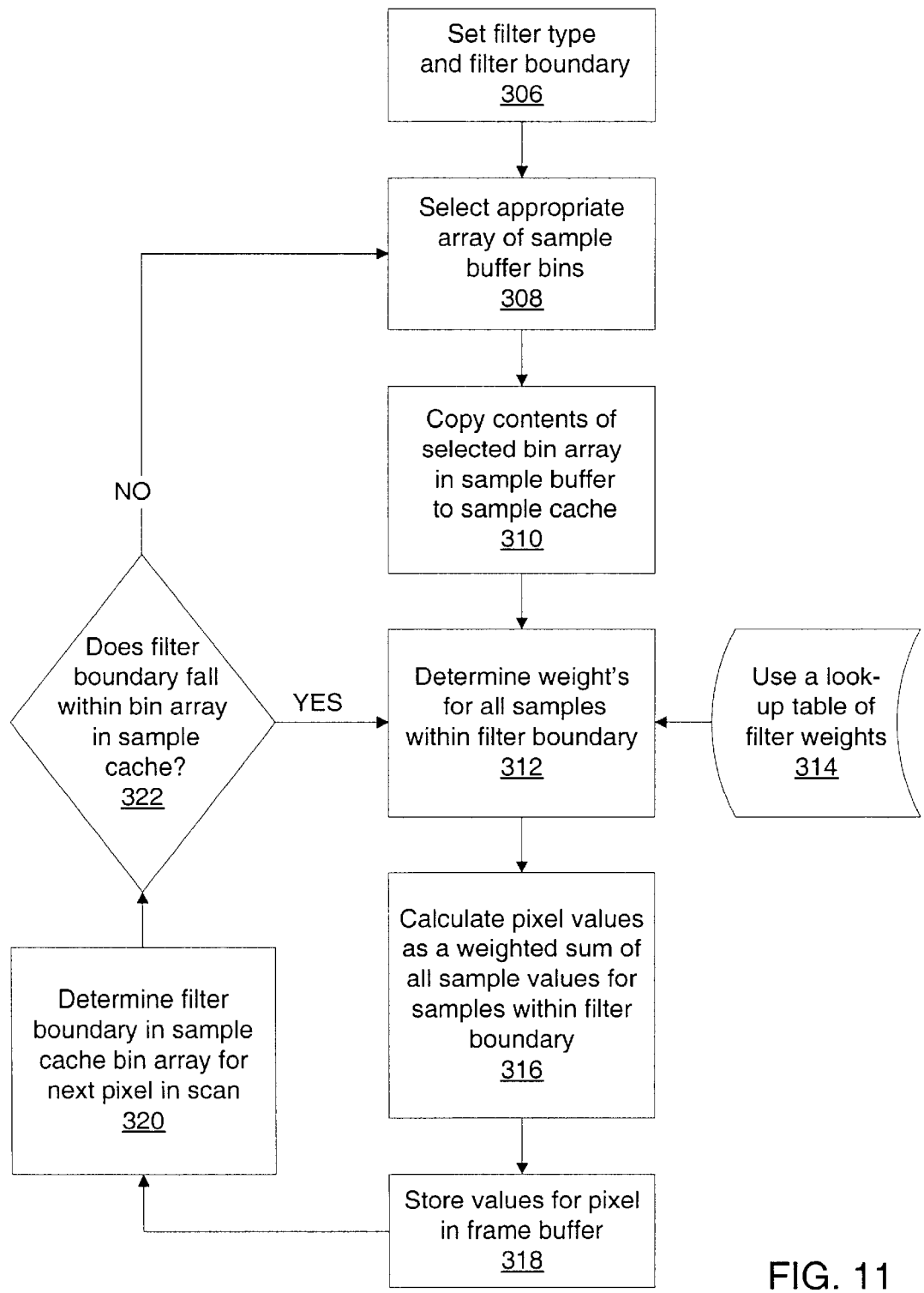
FIG. 11 is a flowchart that illustrates one example of a method for the reuse of sample values in filtering calculations for more than one pixel without additional reads from the sample buffer.

Samples from Sample Cache Re-Used for Sequential Pixels—FIGS. 10a, 10b, & 11

The efficiency of the sample cache may be further improved by re-using samples in subsequent pixel calculations. Referring to FIG. 10a, the read orders (numbered 0–8) load the cache in 2 bin wide strips of n bins, where n is determined by the filter function used. In the example shown in FIG. 10b, the 6×5 array of bins will be used for two sequential pixel filtration calculations. The flowchart of FIG. 11 illustrates one embodiment of the method involved in the reuse of samples. After the sample filter 172 stores the calculated pixel values in frame buffer A 42 or B 44 (step 318), determines the filter center and boundary for the next pixel in the scan (step 320), and then checks to see if the new filter boundary falls within the bin array already in the sample cache 50 (step 322). When the new filter boundary is within the bin array (Yes), the current memory is reused for the next filtration calculation. When it is not (No), additional bins are copied from the sample buffer 40 to the sample cache 50.

In addition, in one embodiment, calculated sums for a bin may be tagged and reused when an averaging filter type is selected and an entire bin of samples is repeated in a subsequent pixel's filtration calculation. In some embodiments, address tags (e.g. set-associative tags) are used to mark the bin location for each sample in the sample cache. As the filter center traverses the sample cache along a scan line, the sample cache locations for samples no longer needed become available for new data. In other embodiments, the samples could be tagged using a fully associative approach, or they may be stored in a direct-mapped fashion.

A system and method for a high-speed graphics system has been disclosed. While the embodiments described herein and illustrated in the figures have been discussed in considerable detail, other embodiments are possible and contemplated. It should be understood that the drawings, headings, and detailed description are not intended to limit the invention to the particular forms disclosed, but on the contrary, the intention is to cover all modifications, equivalents, and alternatives falling within the spirit and scope of the present invention as defined by the appended claims.

What is claimed is:

1. A graphics system comprising:
    a graphics processor configured to generate a plurality of samples;
    a memory comprising a sample buffer and a pixel buffer, wherein the graphics processor is configured to store said plurality of samples into sample bins in the sample buffer, and wherein each bin corresponds to a contiguous region in screen space;
    a sample cache coupled to said memory, wherein said sample cache is configured to store an array of sample bins;
    a sample-to-pixel calculation unit coupled to said sample cache, wherein said sample-to-pixel calculation unit is configured to: read sample bins from the sample buffer, write the sample bins to the sample cache, select and filter samples in a first set of sample bins stored in said sample cache to form a first pixel, and store the first pixel in the pixel buffer, wherein said sample-to-pixel calculation unit is also configured to reuse at least a portion of the first set of sample bins in the sample cache as part of a second set of sample bins, filter samples in the second set of sample bins to form a second pixel, and store the second pixel in the pixel buffer; and
    wherein said sample-to-pixel calculation unit, said sample cache, and said graphics processor reside on a common chip.

2. The graphics system as recited in claim 1, wherein the contiguous region of screen space corresponding to a sample bin is rectangular, and a combination of all sample bins covers screen space with no bin overlapping another bin.

3. The graphics system as recited in claim 1, wherein a square grid subdivides sample space, where each grid square defines a region of sample space corresponding to a sample bin.

4. The graphics system as recited in claim 1, wherein the samples within a particular bin share common maximum possible and minimum possible x and y coordinates.

5. The graphics system as recited in claim 1, wherein said first set of sample bins is an array of bins comprising N by N bins, wherein N is a positive integer.

6. The graphics system as recited in claim 1, wherein said sample-to-pixel calculation unit stores bin sums for reuse in filtering the second set of samples for the second pixel.

7. The graphics system as recited in claim 1, wherein said bins are tagged to facilitate the retention or elimination of bins from the sample cache.

8. The graphics system as recited in claim 1, wherein said sample-to-pixel calculation unit is configured to position the filter for a next pixel to be calculated, determine an array of bins for the next filtration, compare the array of bins with the bins already stored in the sample cache, and either proceed with the filtration if all bins are present, or if one or more bins are missing, copy the missing bins from the sample buffer to the sample cache.

9. The graphics system as recited in claim 1, further comprising:
    a CPU,
    a memory coupled to the CPU, and
    a bus coupling the CPU and the memory to the graphics processor.

10. The graphics system as recited in claim 9, further comprising a video output unit and a display device coupled to receive and display said pixels.

11. The graphics system as recited in claim 1, wherein sample data is read at a higher rate from said sample cache than from said sample buffer.

12. The graphics system as recited in claim 1, wherein the sample to pixel calculation unit is operable to read sample data from the sample buffer and write the sample data in an inactive portion of the sample cache at the same time as the sample to pixel calculation unit is filtering sample data from an active portion of the sample cache.

13. A method for rendering objects with a computer graphics system, the method comprising:
    selecting a plurality of sample positions;
    calculating sample values for the sample positions;
    storing the samples in sample bins in a sample buffer, wherein each bin corresponds to a contiguous region in screen space;
    reading a selected set of sample bins from the sample buffer;
    writing the selected set of sample bins to a sample cache;
    filtering samples in a set of sample bins in the sample cache to form an output pixel, wherein said filtering is performed at least once per pixel per frame, wherein one or more of the sample bins in said sample cache are reused to form more than one output pixel,
    wherein said output pixels are stored in a pixel buffer; and wherein said calculating, writing, and filtering operations are performed on a common chip.

14. The method as recited in claim 13, wherein said selecting comprises specifying each sample position according to one of the following: a regular grid, a perturbed regular grid, or a stochastic grid.

15. The method as recited in claim 13, wherein the sample buffer and the pixel buffer are implemented using a common set of random access memory (RAM).

16. The method as recited in claim 13, wherein the bins have a variable number of samples.

17. The method as recited in claim 13, wherein said copying comprises determining a sample buffer bin array that corresponds to a particular output pixel to be calculated and includes at least all the samples within a predetermined filter extent centered on the output pixel.

18. The method as recited in claim 13, wherein said filtering comprises choosing a filter type and a filter boundary, selecting a bin array that encompasses the full extent of the selected filter boundary, determining weights for all samples within the bin array, and calculating values for the output pixel by summing the weighted values for each of the samples within the bin array on a per-pixel component basis.

19. The method as recited in claim 18, wherein said filtering comprises setting a weighting factor equal to zero for each sample that is positioned within said bin array, but lies outside the selected filter boundary.

20. The method as recited in claim 18, wherein said filtering comprises determining the bin array required for the next pixel to be filtered, comparing this array with the bins stored in the sample cache, and when no new bins are required, reusing the current contents of the sample cache for the next pixel's filter calculations.

21. The method as recited in claim 13, wherein said filtering comprises determining a weighting factor for each sample, wherein the weighting factor is related to the distance between the position of said sample and the center of the pixel, and wherein the weighting factor is interpolated from a look-up table.

22. The method as recited in claim 13, wherein said filtering comprises multiplying each sample's color component values with a weighting factor associated with the sample's position, individually summing the weighted color component values for all of the samples in the subset of the sample cache, and dividing the weighted sums for each color component by the sum of the weights to obtain normalized weighted sums as the pixel's color component values.

23. The method as recited in claim 13, wherein said filtering comprises determining a weighting factor for each selected sample that is positioned within a selected filter extent, wherein the weighting factor is related to the distance between the sample position and the center of the output pixel being calculated and multiplying each sample's color component values with the weighting factor.

24. The method as recited in claim 13, wherein said filtering comprises averaging the sample values for all samples that lie within a selected filter boundary.

25. The method as recited in claim 18, wherein said filtering comprises determining the bin array required for the next pixel to be filtered, comparing this array with the bins stored in the sample cache, and when one or more new bins are required, copying the missing bins from the sample buffer to the sample cache and then using the contents of the sample cache for the next pixel's calculations.

26. The method as recited in claim 13, wherein said filtering is performed at a faster rate utilizing sample values read from a sample cache that is located on the same chip that performs the said filtering rather than filtering sample values read directly from the sample buffer.

* * * * *